United States Patent

Reynoso et al.

[11] Patent Number: 5,732,920
[45] Date of Patent: Mar. 31, 1998

[54] LAMP NECK ASSEMBLY

[75] Inventors: Federico Reynoso, Norwalk, Conn.; Frank R. Mazzotta, Granite Springs, N.Y.

[73] Assignee: Luxo Corporation, Port Chester, N.Y.

[21] Appl. No.: 731,673

[22] Filed: Oct. 17, 1996

[51] Int. Cl.$^6$ ............................................. E04G 3/00
[52] U.S. Cl. ........................ 248/278.1; 403/119; 403/164
[58] Field of Search .................... 248/278.1, 281.11, 248/282.1, 284.1, 276.1, 274.1; 403/164, 165, 119, 53

[56] References Cited

U.S. PATENT DOCUMENTS

| | | | |
|---|---|---|---|
| 3,188,460 | 6/1965 | Thorsen et al. | 403/53 |
| 3,983,386 | 9/1976 | Schallenkammer . | |
| 4,381,538 | 4/1983 | Warshawsky . | |
| 4,470,106 | 9/1984 | Norton | 248/287.1 X |
| 4,605,995 | 8/1986 | Pike . | |
| 4,747,025 | 5/1988 | Barton . | |
| 4,880,193 | 11/1989 | Warshawsky | 248/122 |
| 5,147,132 | 9/1992 | Lee . | |

FOREIGN PATENT DOCUMENTS

| | | | |
|---|---|---|---|
| 553036 | 5/1943 | United Kingdom | 248/278.1 |

*Primary Examiner*—Ramon O. Ramirez
*Attorney, Agent, or Firm*—Fitzpatrick, Cella, Harper & Scinto

[57] ABSTRACT

A lamp head mounting assembly for securing a lamp head to a lamp support arm is disclosed in which a support boss having a base, at least one arcuate wall upstanding from the base, and an open top secured to the lamp head. A pivot bearing is mounted in the boss for rotation on a first axis generally perpendicular to the base, the pivot means having a spindle extending therefrom generally perpendicular to the first axis of rotation and defining a second axis of rotation. The spindle is pivotally mounted in the lamp support arm for rotation about the second axis. A top is provided on the boss and clamped to it to apply a first clamping force to the pivot means between the top and the base of the boss. An additionally manually adjustable clamping device is provided to apply additional force to the pivot means to resist pivotal movement thereof and hold the lamp head in a fixed position.

19 Claims, 4 Drawing Sheets

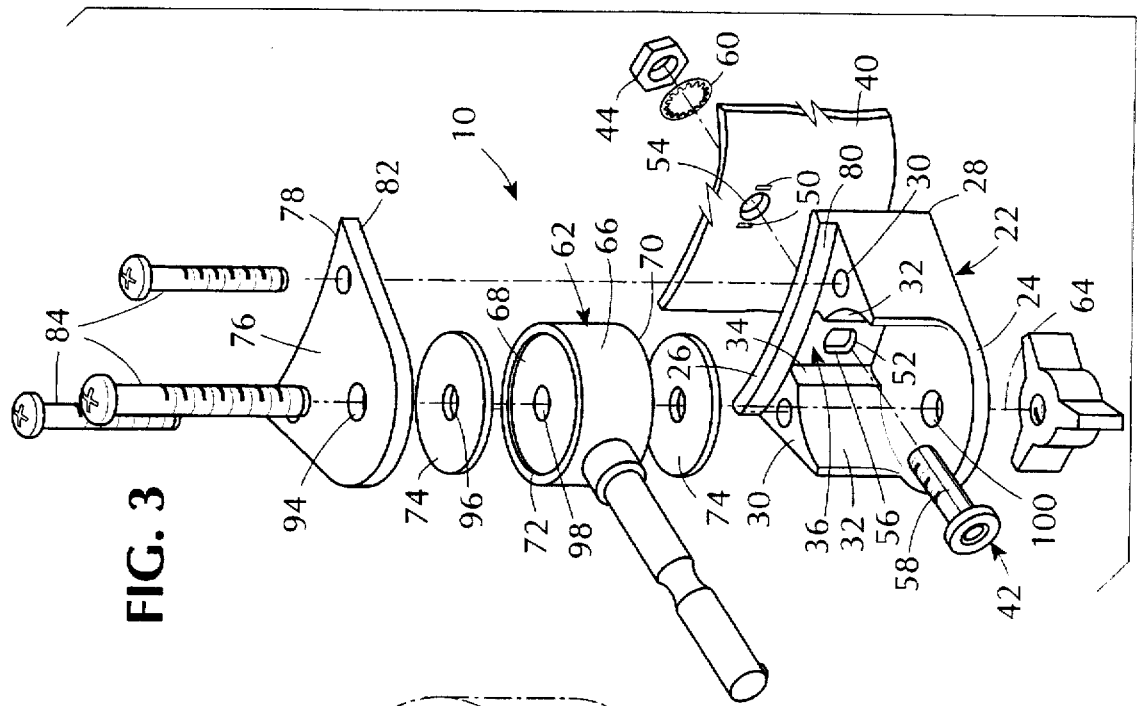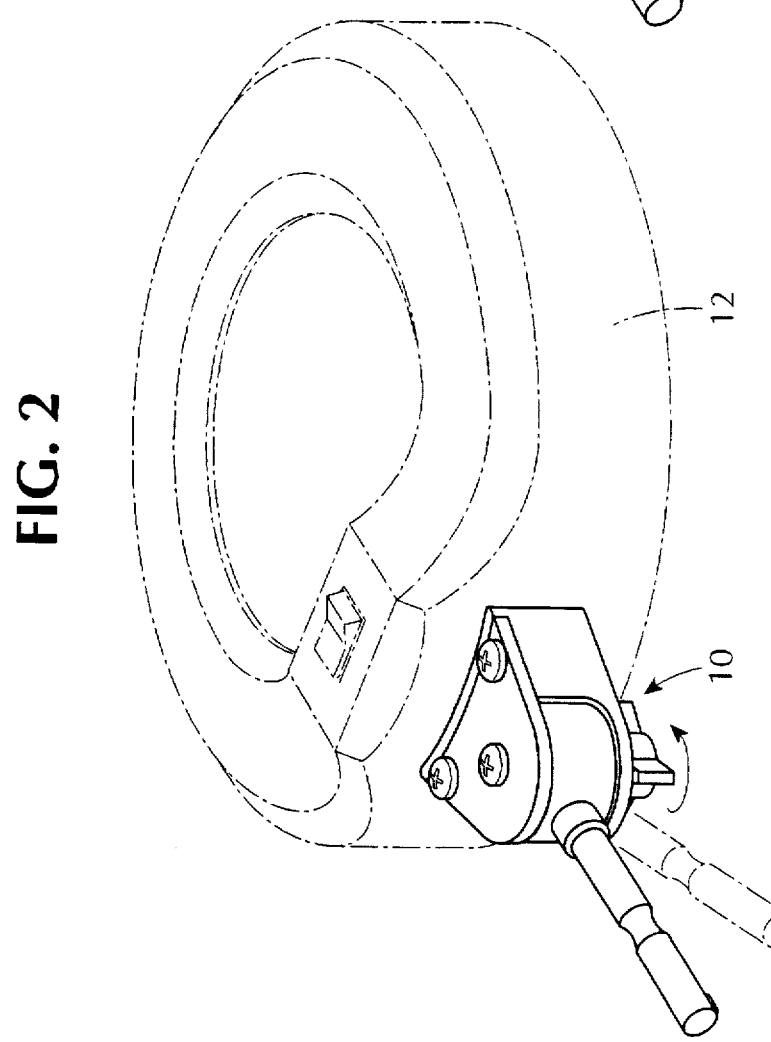

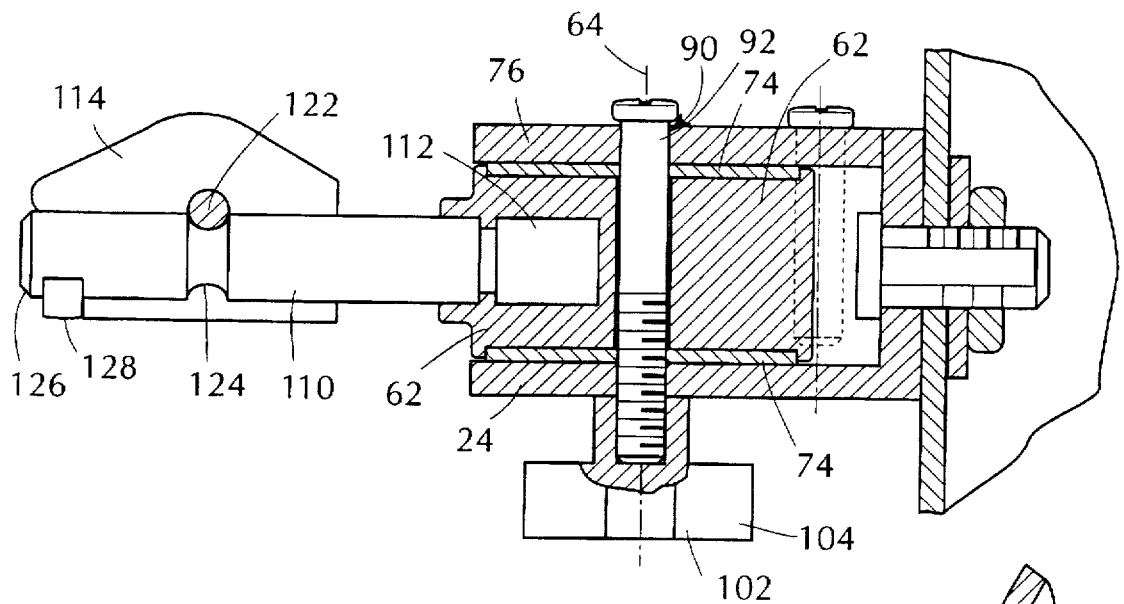
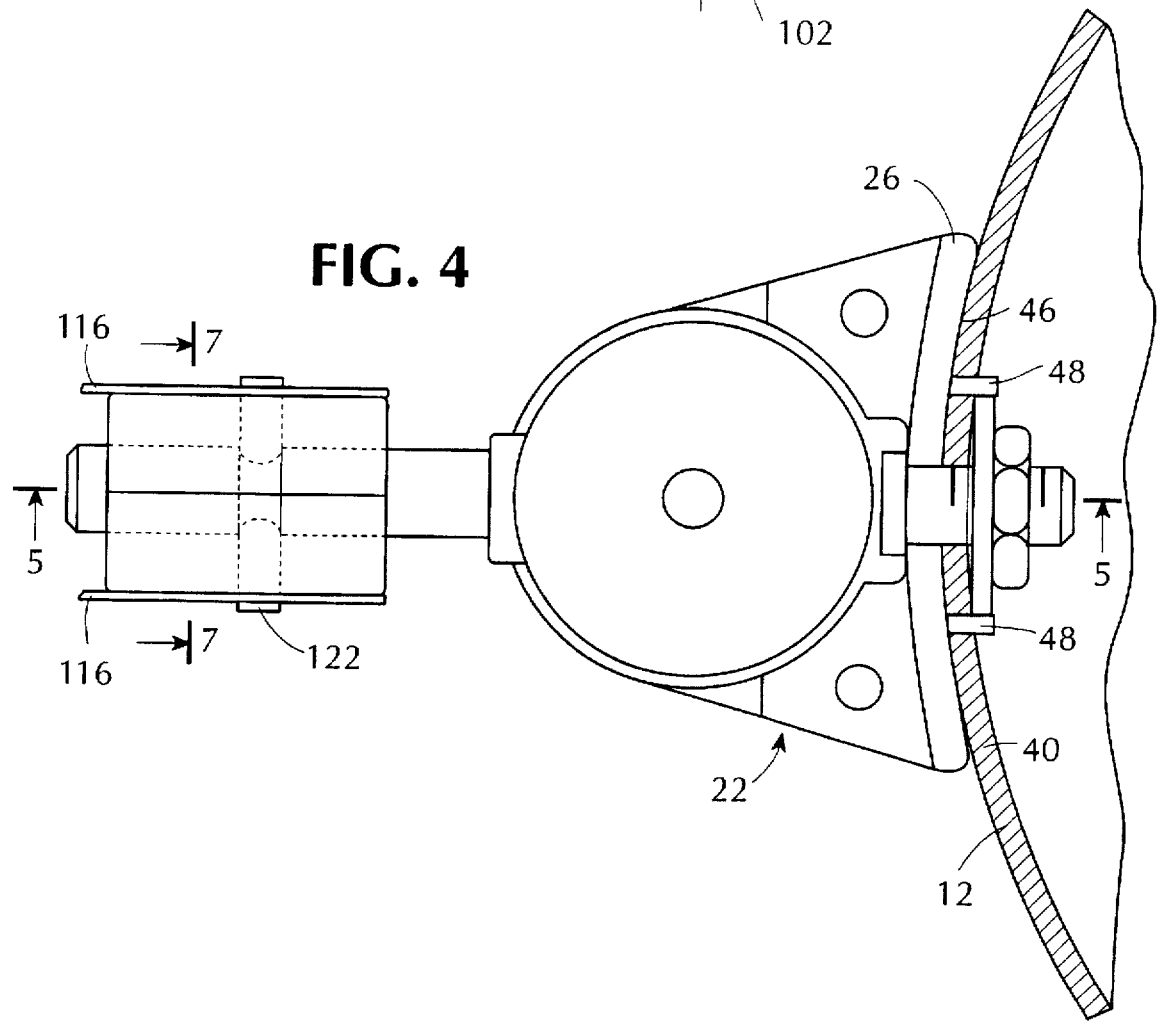

LAMP NECK ASSEMBLY

CROSS REFERENCE TO RELATED APPLICATIONS (Not Applicable)

STATEMENT REGARDING FEDERALLY RESPONSIVE RESEARCH OR DEVELOPMENT (Not Applicable)

BACKGROUND OF THE INVENTION

The present invention relates to electric lighting fixtures, and more in particular to an assembly for mounting a lamp head to a lamp support arm.

Articulated lamp assemblies are well known. Such assemblies, typically include a lamp head and a spring balance arm arrangement which allows the head to be moved about a work surface to a variety of positions. This general arrangement is well known as the "Architect's Lamp". Certain of such lamp assemblies are provided with particularly heavy lamp heads, for example, those using a magnifying glass in a lamp head which is surrounded by a concentric fluorescent light fixture. These kinds of magnifying lamp arrangements are quite heavy and often move from place to place over a work surface to allow the operator to inspect the workpiece through the magnifying glass of the lamp. In such applications it is important that the lamp head be held in a fixed position despite being moved from place to place. It has been found that this is particularly difficult to achieve as lamps are used and surfaces wear. At the same time, it is desirable that the head be adjustable at a variety of angles to the arm so that the optimum viewing position using the lamp head can be arranged by the operator.

BRIEF SUMMARY OF THE INVENTION

It is an object of the present invention to provide a lamp head mounting assembly which is relatively simple in construction and allows a heavy lamp head to be moved between a plurality of positions.

Another object of the present invention is to provide a lamp head assembly which allows a lamp head to be mounted on a support arm through a joint which has two axis of rotation, yet will hold the lamp head steady in any position to which it is moved.

Another object of the present invention is to provide a lamp head mounting assembly of the character described which is relatively simple in construction and effective in operation.

In accordance with an aspect of the present invention, a lamp head assembly is provided for securing a lamp head to a lamp support arm. The assembly includes a support boss which has a base and a curved abutment wall projecting upwardly from the base along a peripheral portion thereof. The boss is secured to the lamp head by a fixed mounting which prohibits movement of the head relative to the boss.

A generally cylindrical bearing is positioned in the boss. The bearing has a cylindrical side wall generally complementary to the arcuate wall of the boss. It also has a bottom wall facing the base of the boss and a top wall. The spindle projects from the cylindrical side wall of the bearing perpendicular thereto and is pivotally mounted on the end of a support arm for rotation about the axis of the spindle.

A clamping top is mounted on the generally flat upper surface of the boss' curved wall and is secured thereto so that a portion of the top overlies the bearing and applies a clamping force to the bearing which resists movement of the bearing in the boss. However, the degree of pivotal movement is permitted by manually moving the head about the bearing. Additional means are provided which extend through the base bearing end top to define an axis of rotation for the bearing in the boss and for selectively applying additional force to the bearing as wear loosens the joint.

The above, and other objects, features and advantages of this invention will be apparent in the following detailed description of an illustrative embodiment thereof, which is to be read in connection with the accompanying drawings wherein:

BRIEF DESCRIPTION OF THE DRAWINGS

FIG. 2 is an enlarged perspective view of the lamp head mounting assembly of the present invention;

FIG. 3 is an exploded perspective view of the lamp head mounting assembly shown in FIG. 2, along with a portion of the side wall of the lamp head;

FIG. 4 is a plan view of the lamp head mounting assembly of the present invention;

FIG. 5 is a sectional view taken along line 5—5 of FIG. 4;

DETAILED DESCRIPTION OF THE INVENTION

Figure 1:
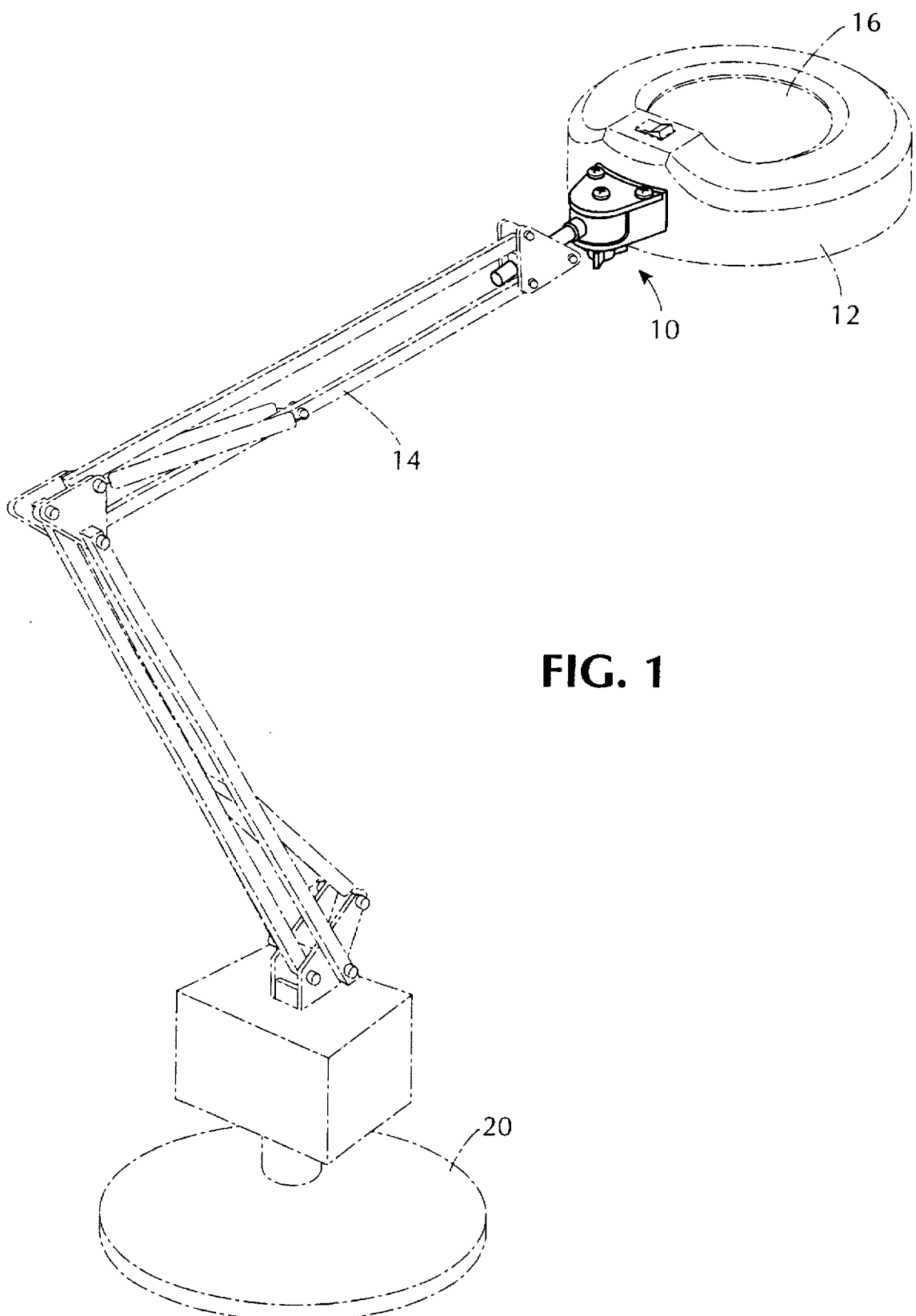
FIG. 1 is a perspective view showing a lamp head mounting assembly constructed in accordance with the present invention, secured to a lamp head and mounting support arm, which are shown in phantom lines.
Figure 6:
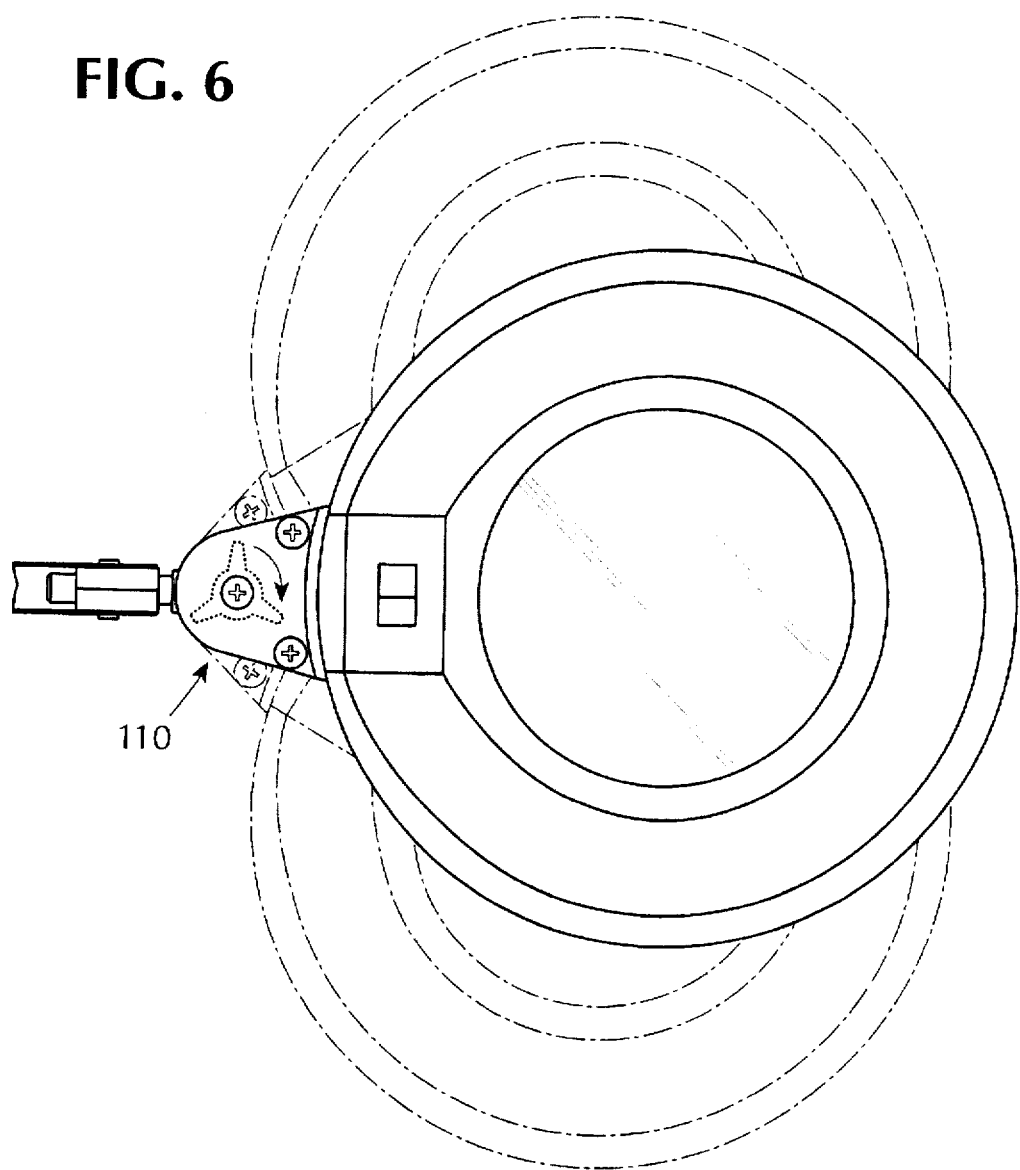
FIG. 6 is a plan view of the lamp head mounting assembly shown secured to the lamp head and the mounting arm with various positions indicated in phantom lines.

Referring now to the drawings in detail, and initially to FIG. 1 thereof, a lamp head mounting assembly 10 constructed in accordance with the present invention is illustrated. The mounting assembly serves to connect the lamp head 12 to a mounting arm assembly 14. The lamp head and mounting arm assembly are shown in phantom lines for illustrative purposes. They are of conventional construction such as are used in a variety of lamps sold by Luxo Corporation. In the illustrative embodiment of the invention, the lamp head 12 is a conventional fluorescent bulb lamp head using an annular fluorescent bulb mounted in the head about a magnifying lens 16. This head is relatively heavy and places relatively substantial stress on the lamp head mounting assembly and the support arm. The support arm itself is a conventional spring balanced arm assembly mounted on a pedestal base 20, or the like. The lamp head mounting assembly allows the operator to move the lamp head about two axis of rotation defined by the mounting, while the arm 14 and its rotatable mounting on the base 20 allows the lamp head to be moved to a variety of positions about the work surface. As discussed above, the magnifier type lenses are used in assembling a variety kinds of equipment such as, for example, electronic circuit boards, and the user constantly varies the position of the lamp head and magnifying lens in order to assist in performing his or her work. The mounting assembly of the present invention holds the lamp head firmly in whatever fixed position it is moved to.

Referring now to FIGS. 2 and 3, the lamp head assembly 10 includes a mounting element or boss 22. The boss 22 is formed of metal or other sturdy material. It has a base 24 and a vertical wall 26 along its rear edge 28. In addition, two abutments 30 are formed on the base 24 and extend upwardly therefrom. These abutments have internal arcuate vertical walls 32 whose ends 34 are spaced from each other by a gap 36 therebetween.

As seen in FIGS. 3 and 4, the boss 22 is secured to the vertical wall 40 of lamp head 12 by a bolt and nut arrangement 42, 44. The face 46 of vertical wall 26 has a pair of fingers 48 extending outwardly therefrom which are received in complementary openings 50 formed in the lamp head wall 40. The engagement of the tabs 48 in the holes 50 insure that the mounting boss is held against relative rotation with respect to the lamp head. The bolt 42 is received in an opening 52 formed in wall 26 and in opening 54 formed in the lamp head wall 40. The opening 52 in the wall 26 of boss 22 has a pair of flat sides 56 and the bolt 42 has corresponding flat surfaces 58 formed therein. This prevents the bolt from rotating in the boss and secures maintenance of a tight connection between the boss and the lamp head. The nut 44 is of conventional construction and is engaged with a lock washer 60 on the bolt 58 to secure the boss to the lamp head.

A cylindrical bearing or pivot member 62 is received in the space above base 24 adjacent the arcuate walls 32 of the abutments 30 in order to provide for pivotal movement of the lamp head about a first axis 64. The cylindrical bearing 62 has a cylindrical vertical wall 66, an upper or top wall 68 and a bottom wall 70. The upper and bottom walls 68, 70 of bearing 62 have generally circular recesses 72 formed therein. These recesses are adapted to receive the friction reducing washers 74 formed of nylon, or the like.

The bearing and washer assembly is held in the boss 22 by a top member 76. Top member 76 has a rear surface 78 which is complementary to the curvature of the face 80 of wall 26. The rear portion 82 of top 76 mates with and overlies the top surfaces of the abutments 30. Top 76 is clamped to the abutments 30 and boss 22 by the bolts 84. When the bolts 84 are tightened to their fullest extent, the top 76 clamps the bearing washers 74 between the bearings 62 and the top 76 and base 24 in a tight frictional arrangement. However, upon the exertion of sufficient force, the bearing can be rotated between the top 76 and the base 24 to allow the angle of the lamp head relative to the bearing to be changed.

The pivot axis 64 for the bearing 62 is defined by a bolt 90. The bolt 90 has a stem 92 which extends through an opening 94 in top 76 and through corresponding openings in the washers 74 and corresponding openings 96 in washer 74 and 98 in bearing 62. It also extends through the opening 100 formed in the base 24. The bolt is held in place by a threaded nut 102 which has a plurality of finger tabs or wings 104 that allow it to be tightened. With the nut 102 engaged on the stem of the bolt 90, the mounting assembly is secured in place and the bearing cannot slide out of the assembly. In addition, when the frictional engagement maintained by the washers 74 loosens, as for example as a result of wear or age, tightening of the nut 102 will draw the cover 76 towards the base 74 to increase the frictional resistance to movement of the bearing in the assembly.

Figure 7:
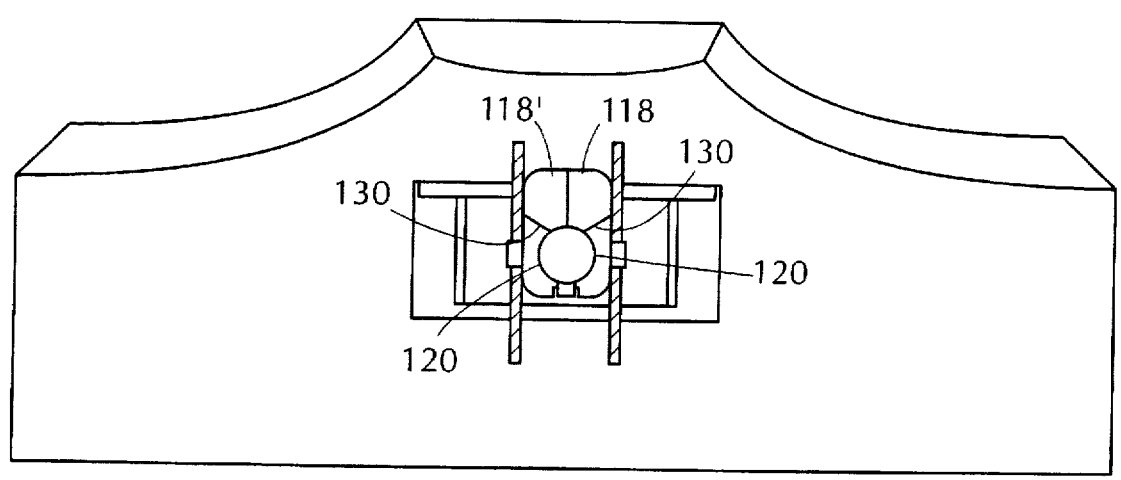
FIG. 7 is a sectional view taken along line 7—7 of FIG. 4.

Bearing 62 includes a stem 110 having a first end 112 secured in the bearing. The stem is secured in the bearing in any convenient manner and, indeed, can be cast in place with the metal bearing. The stem 110 defines a second axis of rotation for the head relative to the support arm 14. It extends outwardly from the vertical side wall 66 of the bearing. The stem is mounted in the end of the arm 14 by a bearing arrangement 114 which is clamped in place between the end plates 116 mounted at the free end of the arm 14. The bearing 114 consists of two bearing plates 118 which are of identical construction. Each bearing plate has a semicircular longitudinal recess 120 formed therein so that when the two bearing plates are positioned together, as shown in FIG. 7, they form a cylindrical passage for the stem 110. The bearing plates are held in position by a pin 122 which extends between the bearing plates and is received in a groove 124 formed in the stem. Thus, the stem cannot move longitudinally along its axis when clamped between the plates 116. This pinning arrangement is achieved with a nut and bolt construction in one embodiment or in any other convenient manner as would be apparent to those skilled in the art. The free end 126 of the spindly 110 includes an integral tab 128 formed therein. The tab 128 is located to engage walls 130 formed in the plates 116. These walls limit rotation of the spindle to about 220°, thereby to avoid twisting of the electrical wires (not shown) which extend from the arm 14 to the head 12.

In use, the lamp head can pivot about the spindle 110 relative to the arm 14. It can also pivot about the bolt 90 on the bearing 62. By loosening the nut 102 the position of the head on the bearing can be easily changed to an angle relative to the spindle 110 as desired by the user. By tightening the nut 102 the position is set and the lamp head will stay in that position during use. Should the angle of at which the lamp head is placed as a result of movement of the arm cause excessive stress on the joint which might result in the head moving on the bearing 62, the nut 102 can be tightened down further to apply additional clamping force to the bearing to resist this movement.

Although an illustrative embodiment of the invention has been described, it is to be understood that the invention is not limited to that precise embodiment and that various changes and modifications may be effected therein by those skilled in the art without departing from the scope or spirit of this invention.

What is claimed is:

1. A lamp head mounting assembly for securing a lamp head to a lamp support arm comprising a support boss having a base, at least one arcuate wall upstanding from said base, an open top and means for securing to the boss to a lamp head; first pivot means mounted in said boss for rotation on a first axis generally perpendicular to said base, said first pivot means including a spindle extending therefrom generally perpendicularly to said first axis and defining a second axis, and means for pivotally mounting said spindle to said arm for rotation about said second axis, a top for said boss and means for securing the top to the boss to clamp said first pivot means between said top and the base of the boss, and means for manually adjusting the clamping fuse applied to said first pivot means.

2. An assembly as defined in claim 1 including friction reducing washers positioned between said pivot and said base and between said pivot and said top.

3. An assembly as defined in claim 2 wherein said means for securing said boss to a lamp head includes at least two tabs extending outwardly from said boss for engagement in generally complementary apertures in a lamp head and a bolt for securing the boss to the lamp head.

4. An assembly as defined in claim 3 wherein said boss has an aperture formed therein for receiving said bolt, said aperture having at least one flat surface and said bolt having a complementary flat surface thereby to prevent rotation of the bolt in the boss.

5. An assembly as defined in claim 4 wherein said pivot means is a generally cylindrical bearing having a cylindrical side wall and top and bottom walls with said spindle extending from said side wall.

6. An assembly as defined in claim 5 including friction reducing annular washers positioned between said top and the top of the bearing and between said bottom wall and the bottom of the bearing.

7. An assembly as defined in claim 6 wherein said top and bottom of the bearing have circular recesses formed therein for receiving said washers.

8. An assembly as defined in claim 1 wherein said means for pivotally mounting said spindle to said arm includes a bearing receiving said spindle and cooperating means on said spindle and bearing for limiting rotation of the spindle in the bearing to less than 180°.

9. An assembly as defined in claim 1 wherein said means for manually adjusting the clamping force applied to said pivot means comprises a bolt extending through said base of the support base, the pivot means and said top to define said first axis and a manually turnable nut for drawing said top and base towards each other to increase friction on said pivot means.

10. An assembly as defined in claim 9 wherein said nut includes finger grip means.

11. A lamp head mounting assembly for securing a lamp head to a lamp support arm comprising a support boss having a base, projecting means projecting upwardly from said base defining an arcuate vertical wall, along a portion of the base, and means for securing said boss to a lamp head; a generally cylindrical bearing positioned in said boss and having a cylindrical side wall generally complementary in arc to said arcuate vertical wall, a bottom wall facing said base, and a top wall; a spindle projecting from said cylindrical side wall and perpendicular thereto, means for pivotally mounting said spindle to said lamp arm for rotation therein; said projecting means projecting upwardly from said base having a generally flat upper surface generally parallel to said base adjacent said arcuate vertical wall; a top for said boss secured to said generally flat upper surface and overlying said bearing to apply a clamping force to the bearing; and means extending through said base, bearing and top for defining an axis of rotation for said bearing in said boss and for selectively applying additional clamping force to the bearing.

12. An assembly as defined in claim 11 wherein said means for securing said boss to a lamp head includes at least two tabs extending outwardly from said boss for engagement in generally complementary apertures in a lamp head and a bolt for securing the boss to the lamp head.

13. An assembly as defined in claim 12 wherein said boss has an aperture formed therein for receiving said bolt, said aperture having at least one flat surface and said bolt having a complementary flat surface thereby to prevent rotation of the bolt in the boss.

14. An assembly as defined in claim 11 wherein the top and bottom walls of the bearing have circular recesses formed therein and a pair of annular friction washers respectively received in said recesses between the bearing and the top and base of the boss to facilitate rotation of the bearing about said means for applying additional clamping force.

15. An assembly as defined in claim 14 wherein said washers are formed of nylon.

16. An assembly as defined in claim 14 wherein said means for selectively applying additional clamping force to the bearing comprises a bolt and a manually turnable nut for drawing said top and base of the support boss towards each other to increase friction on said pivot means.

17. An assembly as defined in claim 16 wherein said nut includes finger grip means.

18. An assembly as defined in claim 16 wherein said means for pivotally mounting said spindle to said arm includes a bearing receiving said spindle and cooperating means on said spindle and bearing for limiting rotation of the spindle in the bearing to less than 180°.

19. An assembly as defined in claim 18 including friction reducing washers positioned between said pivot and said base and between said pivot and said top.

* * * * *